(12) United States Patent
Junior et al.

(10) Patent No.: US 10,994,843 B2
(45) Date of Patent: May 4, 2021

(54) AIRCRAFT CARGO PALLET LOCK ASSEMBLIES

(71) Applicant: EMBRAER S.A., São José dos Campos (BR)

(72) Inventors: Mario Tadeu Crema Junior, São José dos Campos (BR); Saint Clair Trisotto, São José dos Campos (BR); Carlos Rogulski Filho, São José dos Campos (BR); Guilherme Peneluppi Correa, São José dos Campos (BR); Douglas de Moura Germano, São José dos Campos (BR); Jean Carlo de Carvalho Kruger, São José dos Campos (BR)

(73) Assignee: EMBRAER S.A., São José Dos Campos (BR)

( * ) Notice: Subject to any disclaimer, the term of this patent is extended or adjusted under 35 U.S.C. 154(b) by 78 days.

(21) Appl. No.: 16/524,745

(22) Filed: Jul. 29, 2019

(65) Prior Publication Data
US 2021/0031921 A1 Feb. 4, 2021

(51) Int. Cl.
*B64D 9/00* (2006.01)

(52) U.S. Cl.
CPC .................................. *B64D 9/003* (2013.01)

(58) Field of Classification Search
CPC ...... B64D 9/003; B64D 11/0696; B64D 9/00; B64D 2009/006; B64D 11/0007; B64D 11/04; B64D 1/06
USPC .......... 410/77, 80, 69, 92, 2, 44, 90, 97, 94; 244/118.1, 137.1, 118.6
See application file for complete search history.

(56) References Cited

U.S. PATENT DOCUMENTS

| | | | |
|---|---|---|---|
| 3,182,608 A | 5/1965 | Mollon | |
| 4,349,168 A | 9/1982 | Barnes et al. | |
| 4,379,535 A * | 4/1983 | Baldwin | B64D 9/003 244/137.3 |
| 4,498,823 A | 2/1985 | Trautman | |
| 4,583,896 A * | 4/1986 | Vogg | B64D 9/003 244/118.1 |
| 6,488,457 B2 * | 12/2002 | Diamante | B64D 11/0696 410/46 |
| 2002/0131837 A1 * | 9/2002 | Segura | B60P 7/13 410/77 |
| 2013/0334367 A1 | 12/2013 | Larson et al. | |

* cited by examiner

*Primary Examiner* — D Glenn Dayoan
*Assistant Examiner* — Sunsurraye Westbrook
(74) *Attorney, Agent, or Firm* — Nixon & Vanderhye P.C.

(57) ABSTRACT

Aircraft cargo lock assemblies are capable of positionally restraining movement of a cargo load pallet in both vertical and horizontal planes relative to the cargo deck of the aircraft. According to certain embodiments, the lock assemblies will include an actuator case and a restraint element which comprises at least one restraint plate and restraint detent, the restraint element being connected to the actuator case for pivotal movements between locked and released conditions relative to an edge of a cargo load pallet positioned on a cargo deck of an aircraft so as to positionally restrain the cargo load pallet against movement in both vertical and horizontal planes relative to the cargo deck. An actuator assembly is operably connected to the restraint element for moving the restraint element between the locked and released conditions thereof.

25 Claims, 20 Drawing Sheets

AIRCRAFT CARGO PALLET LOCK ASSEMBLIES

FIELD

The embodiments disclosed herein relate generally to lock assemblies for locking cargo load pallets to an aircraft cargo deck and to aircraft provided with such cargo pallet lock assemblies.

BACKGROUND

As is well known, cargo aircraft are configured to carry palletized cargo loads that are positionally locked to the cargo deck of the aircraft. The reliable positional locking of the cargo load pallets to the cargo deck during aerial transport is significantly important to safe aircraft operations as any shift in the cargo load within the aircraft's cargo compartment could adversely affect the aircraft's center of gravity that could in turn adversely (or even catastrophically) affect the aircraft's flight characteristics.

Various pallet locks are therefore known and employed in the art as exemplified by U.S. Pat. Nos. 3,182,608, 4,349, 168 and 4,498,823 as well as US Published Patent Application No. 2003/0334367 (the entire content of each being expressly incorporated hereinto by reference). In this regard, some pallet locks employ manually activated mechanisms such as shear pins which are used to lock the detent in its operational condition to avoid inadvertent detent movement. Such manually activated mechanisms thereby demand that the aircraft's loadmaster operate each lock individually. Other aircraft are known which employ remotely controlled lock units operated from the loadmaster's control panel. Some known lock mechanisms are not however capable of being fully retracted below the cargo deck thereby providing obstacles in the working volume of the cargo space when not in use.

It would therefore be desirable if cargo load pallets could be positionally locked relative to the aircraft cargo deck to restrain pallet movement in both vertical and horizontal directions and also be fully retractable so as to avoid being an obstacle in the cargo space. It is towards providing such a need that the embodiments disclosed herein are directed.

SUMMARY

Broadly, the embodiments disclosed herein are directed toward aircraft cargo lock assemblies that are capable of positionally restraining movement of a cargo load pallet in both vertical and horizontal planes relative to the cargo deck of the aircraft.

According to certain embodiments, the lock assemblies described herein will include an actuator case and a restraint element which comprises at least one restraint plate and restraint detent, the restraint element being connected to the actuator case for pivotal movements between locked and released conditions relative to an edge of a cargo load pallet positioned on a cargo deck of an aircraft so as to positionally restrain the cargo load pallet against movement in both vertical and horizontal planes relative to the cargo deck. An actuator assembly is operably connected to the restraint element for moving the restraint element between the locked and released conditions thereof. The restraint plate is positioned over an edge of the cargo load pallet when the restraint element is in the locked condition thereof so as to positionally restrain the cargo load pallet against movement in the vertical plane relative to the cargo deck, while the restraint detent is positioned in an edge recess of the cargo load pallet when the restraint element is in the locked condition thereof so as to positionally restrain the cargo load pallet against movement in the horizontal plane relative to the cargo deck. The restrain element according to some embodiments may comprise a spaced apart pair of the restraint plates with the restraint detent being positioned therebetween.

The actuator case may be connected to the cargo deck for movements between a stowed mode, wherein the actuator case is substantially flush with the cargo deck, and a deployed mode, wherein the actuator case is raised above the cargo deck. To accomplish such movements, the actuator case may include a hinge assembly at a rearward portion thereof that allows for pivotal connection to the cargo deck, and a linkage support plate at a forward portion thereof that allows for pivotal interconnection between the forward portion of the actuator case to the cargo deck to allow the actuator case to be pivotally moved between the stowed and deployed conditions thereof. According to these embodiments, therefore, the lock assembly may be deployed only when its use is desired but can remain stowed at other times so it does not provide an obstacle on the cargo deck surface.

The actuator assembly that may be employed in certain embodiments may include a linear actuator having an actuator rod that is reciprocally moveable between extended and retracted conditions, and a linkage assembly which translates reciprocal movement of the actuator rod between the extended and retracted conditions into pivotal movement of the restraint element between the locked and released conditions, respectively. The linkage assembly may in turn include a splined command shaft, a bell crank positionally coupled to the command shaft, a rocker linkage assembly operably interconnecting the actuator rod of the linear actuator to the command shaft, and a coupler link operably interconnecting the restraint element to the bell crank. The rocker linkage assembly may be comprised of a linkage rod and a rocker link operably interconnecting a proximal end of the linkage rod to a distal end of the actuator rod, wherein a distal end of the linkage rod is operably connected to the bell crank. In certain embodiments, the coupler link and bell crank are in an over-the-center locking arrangement when the restraint element is in the locked condition thereof, in which case a tension spring may be operably connected to the restraint element for exerting a bias force on the restraint element in a direction to move the restraint element into the released condition thereof.

A rotary transducer may be provided in order to sense positions of the restraint element when moved between the locked and released conditions thereof. Such sensed positions are preferably provided by the rotary transducer in the form of a position signal that is transmitted to and received by a lock controller (e.g., positioned at the loadmaster's control console within the aircraft) so as to provide an indication of the restrain element position. The lock controller may also allow the loadmaster to issue command signals to allow operation of the lock assemblies to thereby move them between the stowed and deployed modes and/or to move the restraint element between the locked and released conditions as may be required during cargo ground-based loading/unloading operations as well as inflight cargo jettisoning operations.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION

Figure 1:
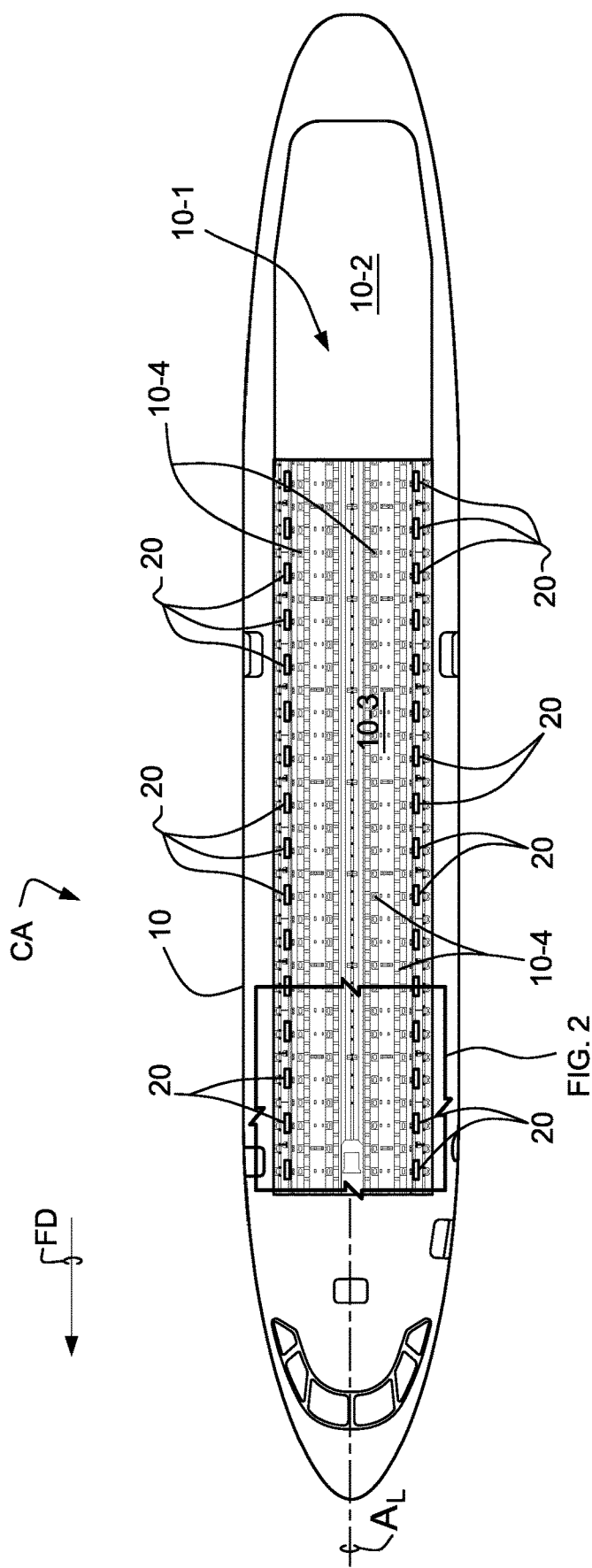
FIG. 1 is an x-ray plan view of a cargo aircraft fuselage which includes an opposed pairs of pallet lock assemblies according to an embodiment described hereinbelow longitudinally arranged along the cargo deck.
Figure 2:
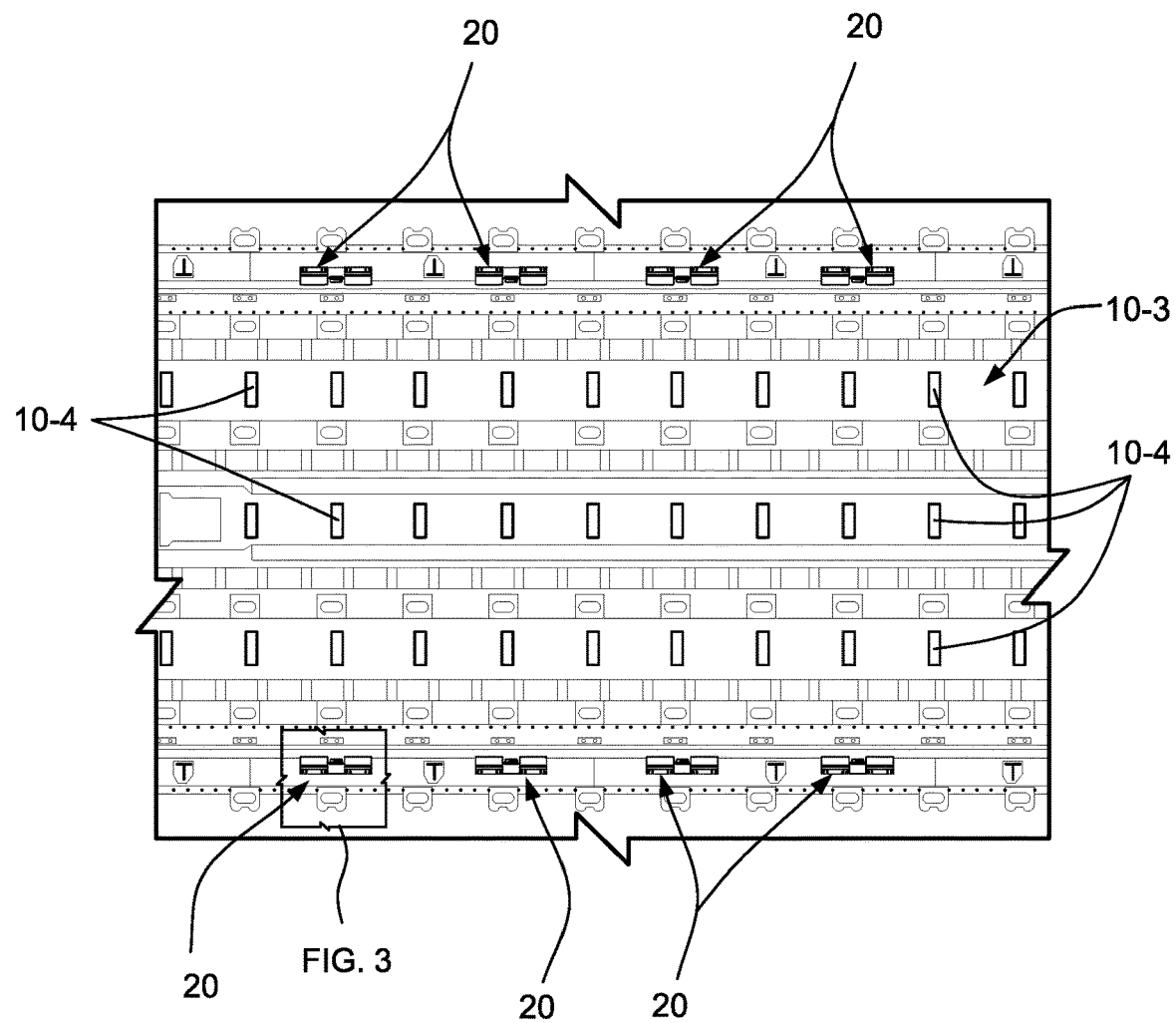
FIG. 2 is an enlarged plan view of an enlarged view of representative opposed pairs of pallet lock assembly as depicted in FIG. 1.
Figure 3:
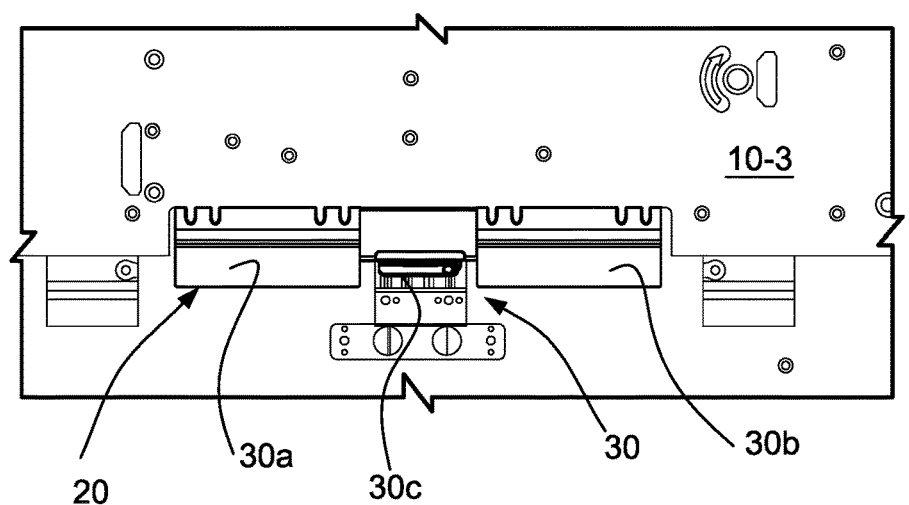
FIG. 3 is an enlarged view of a representative pallet lock assembly as shown in FIG. 2.

Accompanying FIGS. 1-3 show increasingly larger scale depictions of an exemplary interior cargo compartment 10-1 within the fuselage 10 of a conventional cargo aircraft CA. As shown in FIG. 1, the cargo aircraft CA is provided with a rear-entry cargo door/ramp 10-2 and a cargo deck 10-3. As depicted, the cargo deck 10-3 is shown supporting a number of conventional cargo load pallets CLP (not shown in FIG. 1, but see FIG. 4A) however the cargo door/ramp 10-2 could similarly be configured so as to support cargo load pallets CLP. The cargo load pallets are positionally locked relative to the cargo deck 10-3 by a number of pallet lock assemblies (a representative few of which are identified by reference numeral 20 in FIG. 1) to be described in greater detail below. As is conventional, the cargo deck 10-3 may include a series of laterally spaced apart roller equipped guides (a representative few of which are identified by reference numeral 10-4 in FIG. 1) aligned parallel to the longitudinal axis $A_L$ of the fuselage in the flight direction (arrow FD) of the aircraft CA for guiding the individual cargo load pallets CP into the selected position within the cargo compartment 10-1. As is known, access to the cargo compartment 10-1 may be achieved through the cargo door/ramp 10-2 when in a lowered position so as to allow the cargo load pallets CP to be loaded/unloaded from the cargo aircraft CA by suitable cargo handling equipment.

Figure 4A:
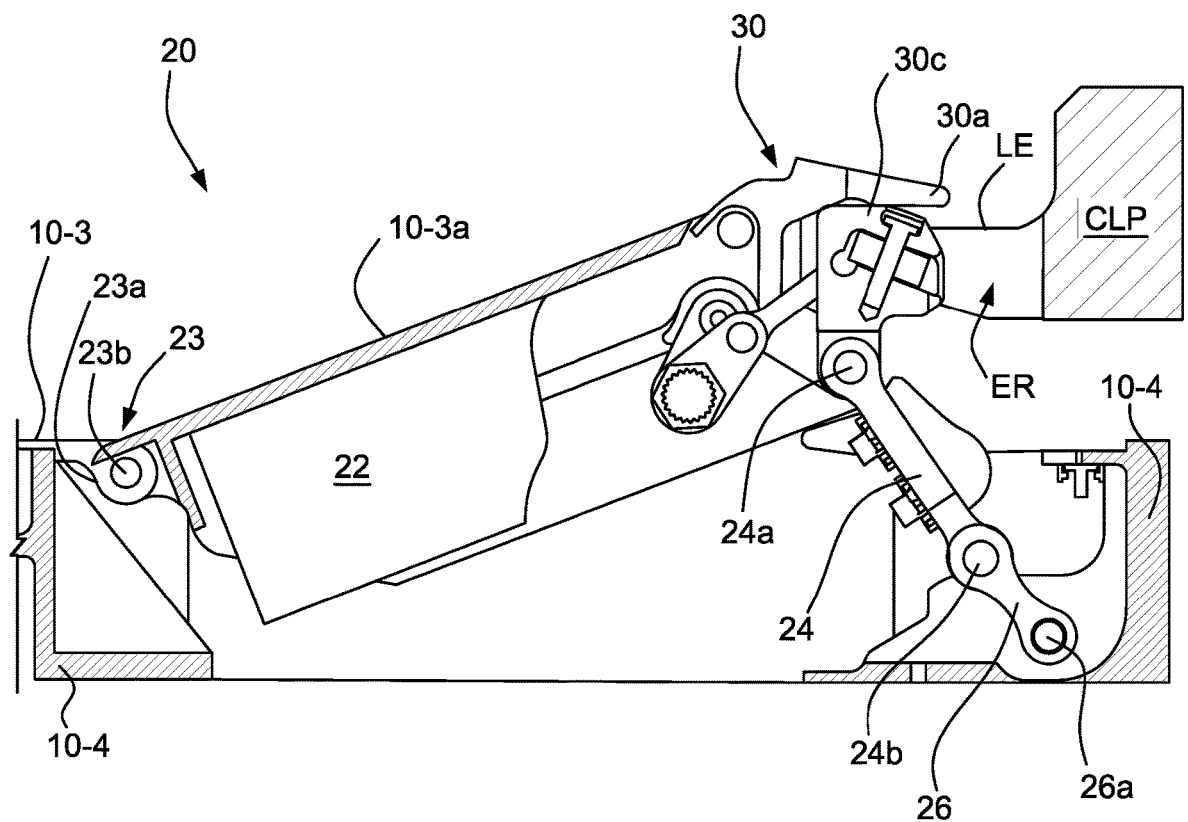
FIGS. 4A and 4B are cross-sectional elevational views showing the pallet lock assembly in deployed and stowed modes relative to the aircraft cargo deck.
Figure 4B:
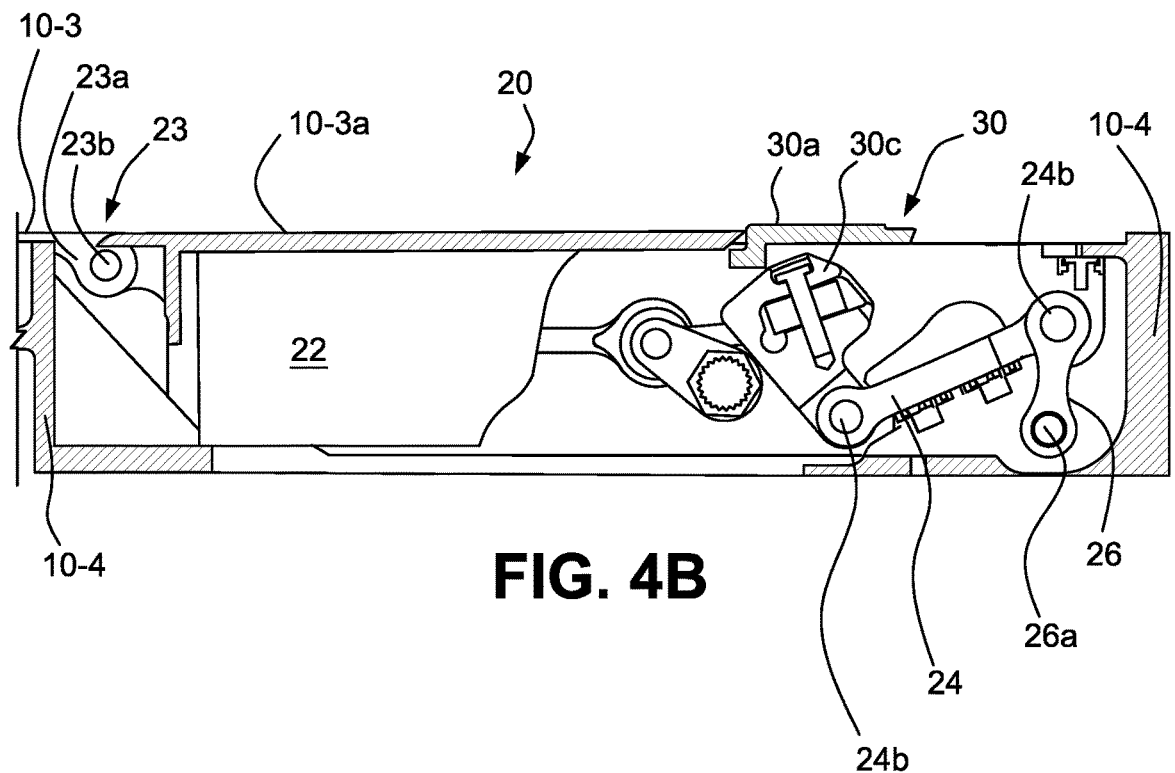

As is perhaps better shown in FIGS. 4A and 4B, each lock assembly 20 is capable of being pivotally moved between deployed and stowed modes, respectively. Specifically, FIG. 4A shows the lock assembly 20 in a deployed mode whereby the lock assembly is angularly oriented upwardly toward the cargo pallet CP. FIG. 4B on the other hand shows the lock assembly 20 in a stowed condition whereby the lock assembly 20 is fully retracted within the cargo deck 10-3 so as to provide a contiguous top surface 10-3a substantially flush with the top surface of the cargo deck 10-3.

In order to allow such deployment of the lock assembly 20 between the deployed and stowed modes as shown respectively in FIGS. 4A and 4B, the lock assembly 20 is provided with an actuator case 22 (shown partly broken away in FIGS. 4A and 4B for clarity of certain internal mechanisms). An outboard lateral edge of the actuator case 22 is pivotally coupled to an adjacent portion of the fixed cargo deck support 10-4 by way of a hinge assembly 23 associated with the cargo deck 10-3. As shown, the hinge assembly 23 is comprised of hinge 23a and hinge rod 23b. The inboard edge of the actuator case 22 is pivotally coupled to the cargo deck 10-1 by way of a lower linkage support plates 24 and a drive link 26 pivotally coupled at an adjacent end to one another by connection rod 24b and to the inboard edge of the actuator case 22 and an adjacent portion of the fixed cargo deck support 10-4 by connection rods 24a, 26a, respectively. When in the stowed mode as shown in FIG. 4B, turning movement applied to the rod 26a in a counterclockwise direction. Such turning movement may be applied manually by the load personnel but also conceivably could be configured to be connected to an electric or hydraulic drive member. Turning movement of the rod 26a in a counterclockwise direction will in turn drive the linkage support plate 24 in a clockwise direction thereby causing the linkage support plate 26 to extend upwardly so as to raise the lock assembly actuator case 22 of the lock assembly 20 relative to the surface of the cargo deck 10-3 and into the deployed mode shown in FIG. 4A. Reverse movement to that as just described will thereby return the locking assembly 20 from the deployed mode shown in FIG. 4A to the stowed mode shown in FIG. 4B.

Figure 5A:
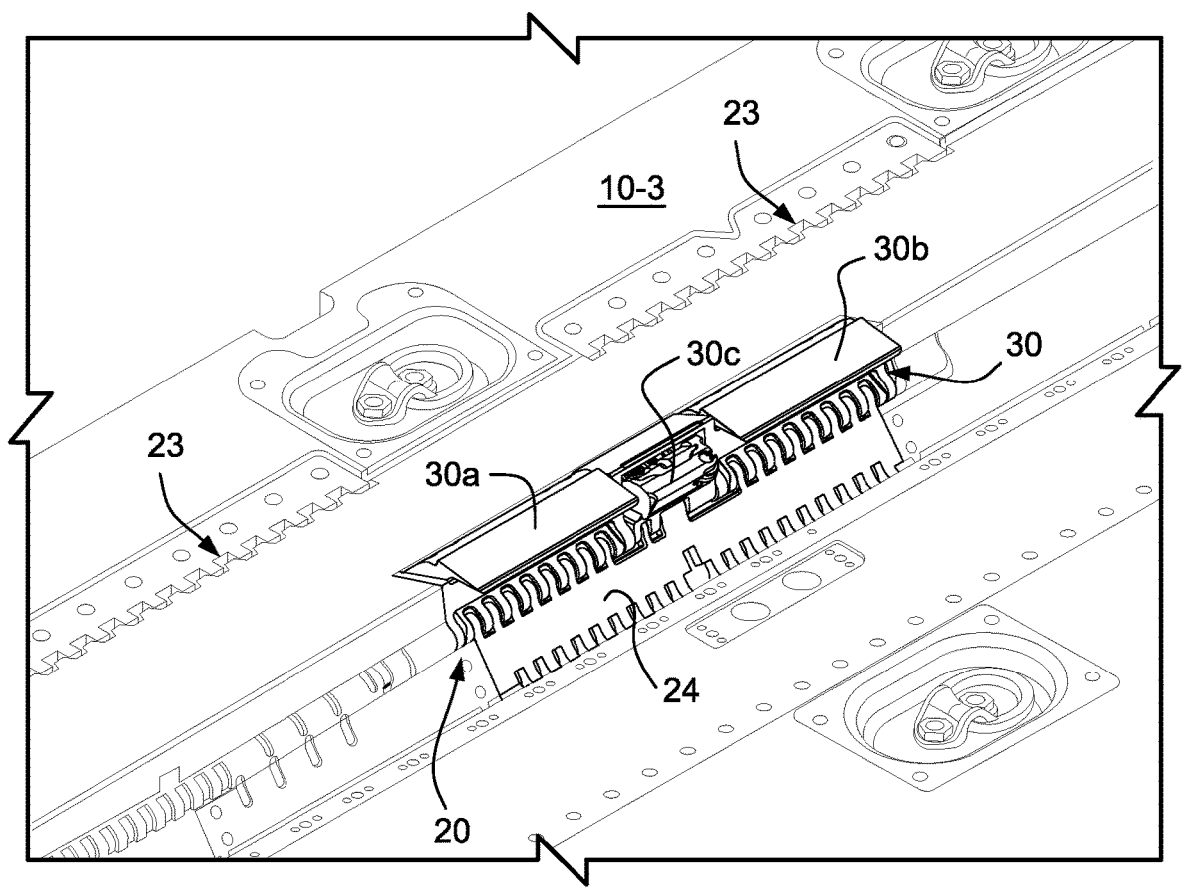
FIGS. 5A and 5B are perspective views of a representative pallet lock assembly depicted in a deployed mode relative to the cargo deck and with the pallet restraint element being in the locked and released conditions, respectively.
Figure 5B:
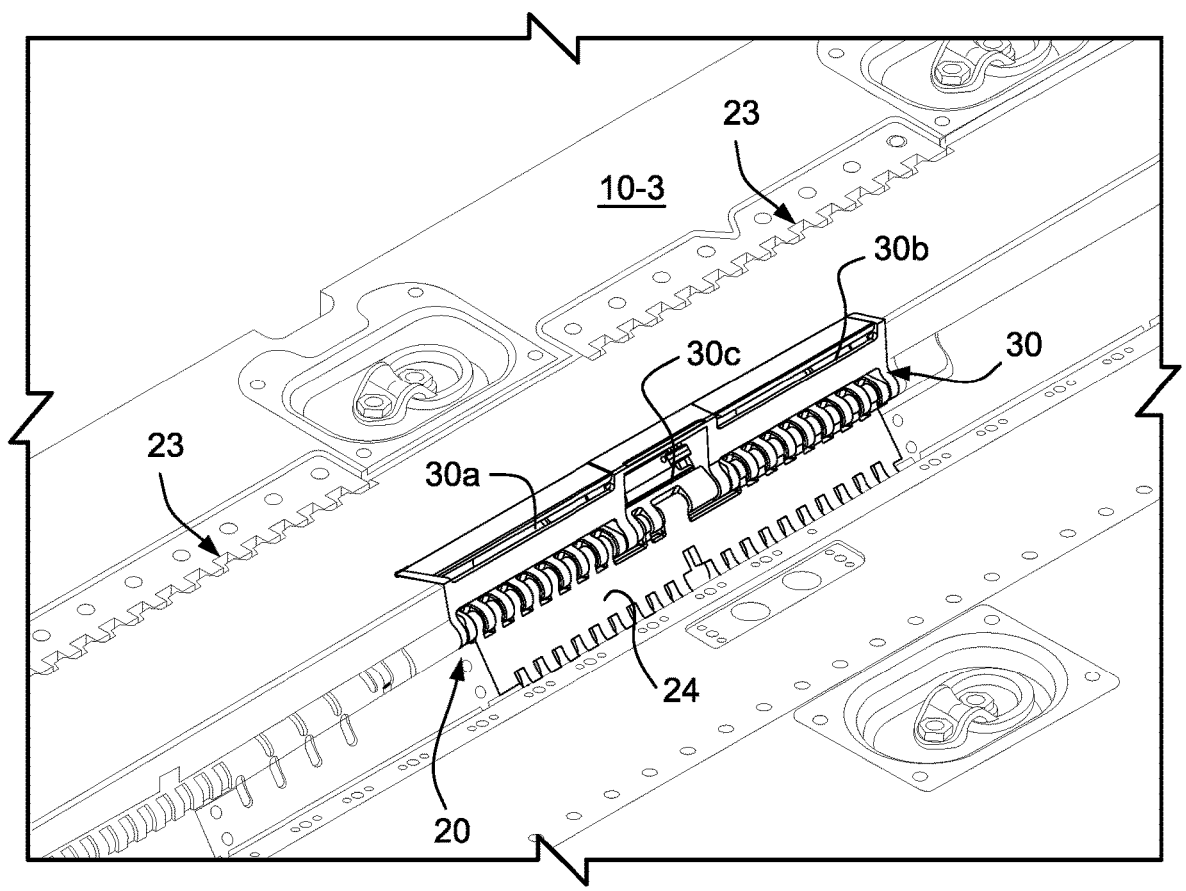
Figure 6:
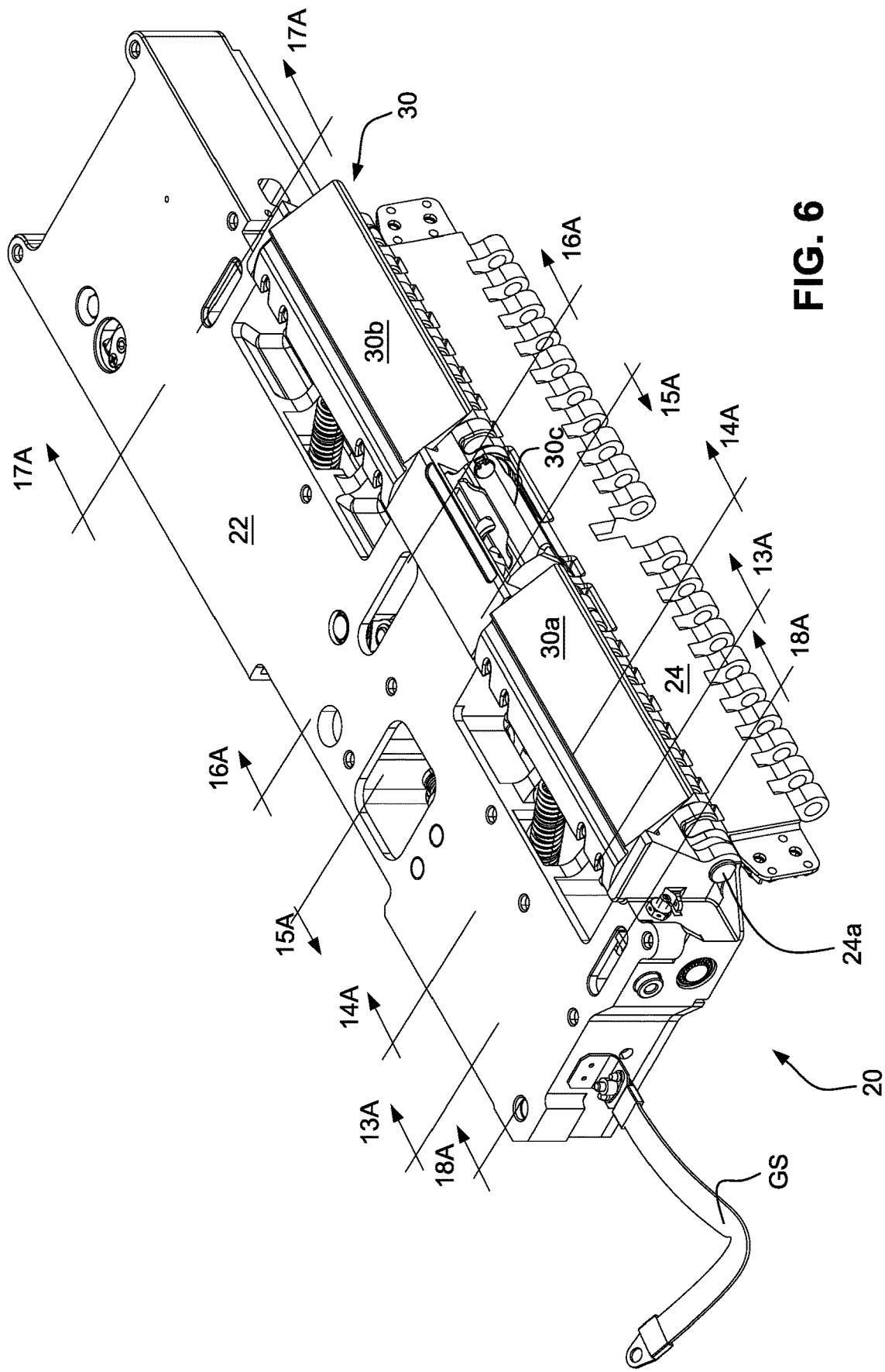
FIGS. 6 and 7 are enlarged perspective views of the pallet lock assembly with the pallet restraint element depicted in locked and released conditions, respectively.
Figure 7:
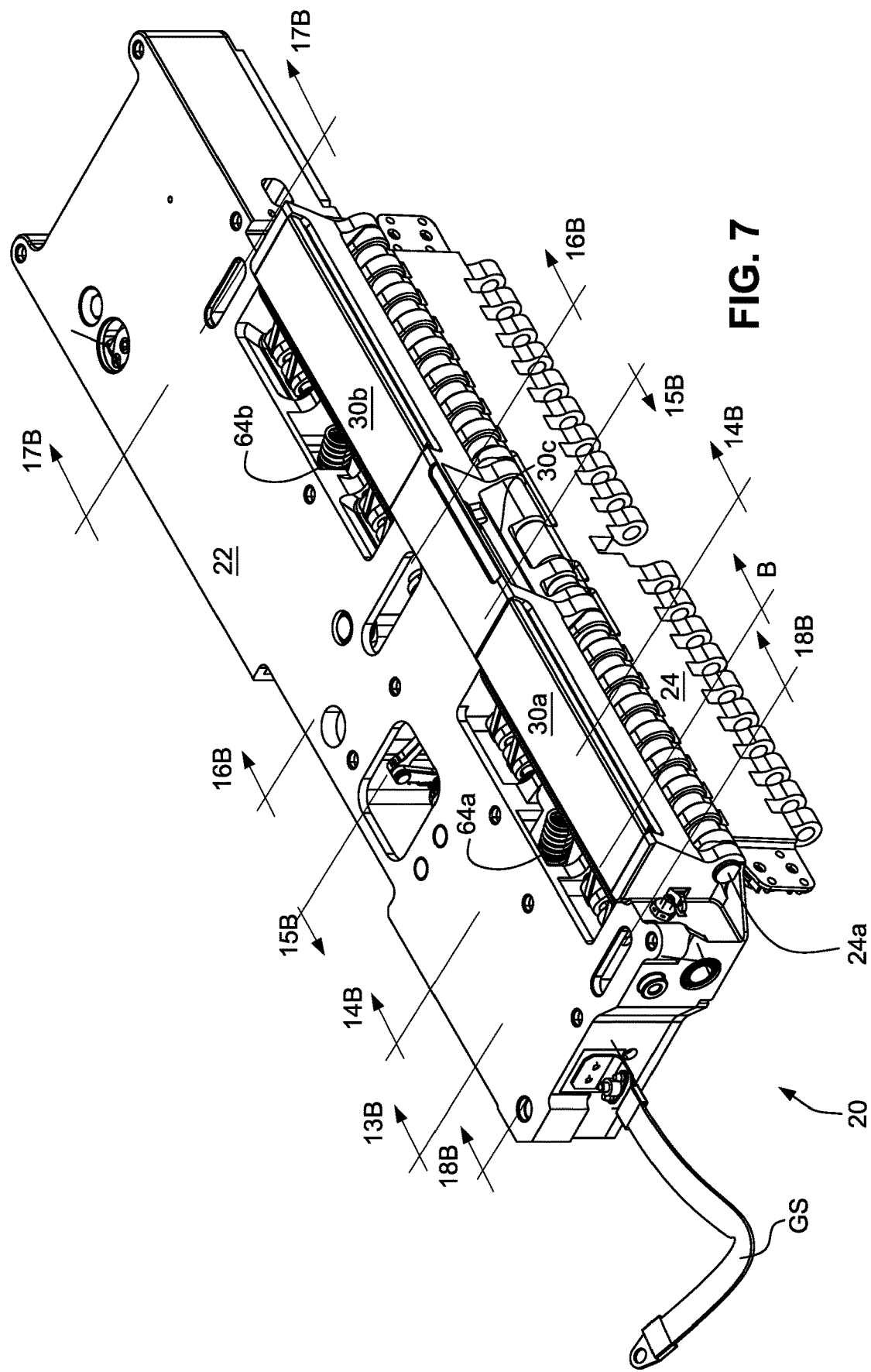
Figure 8:
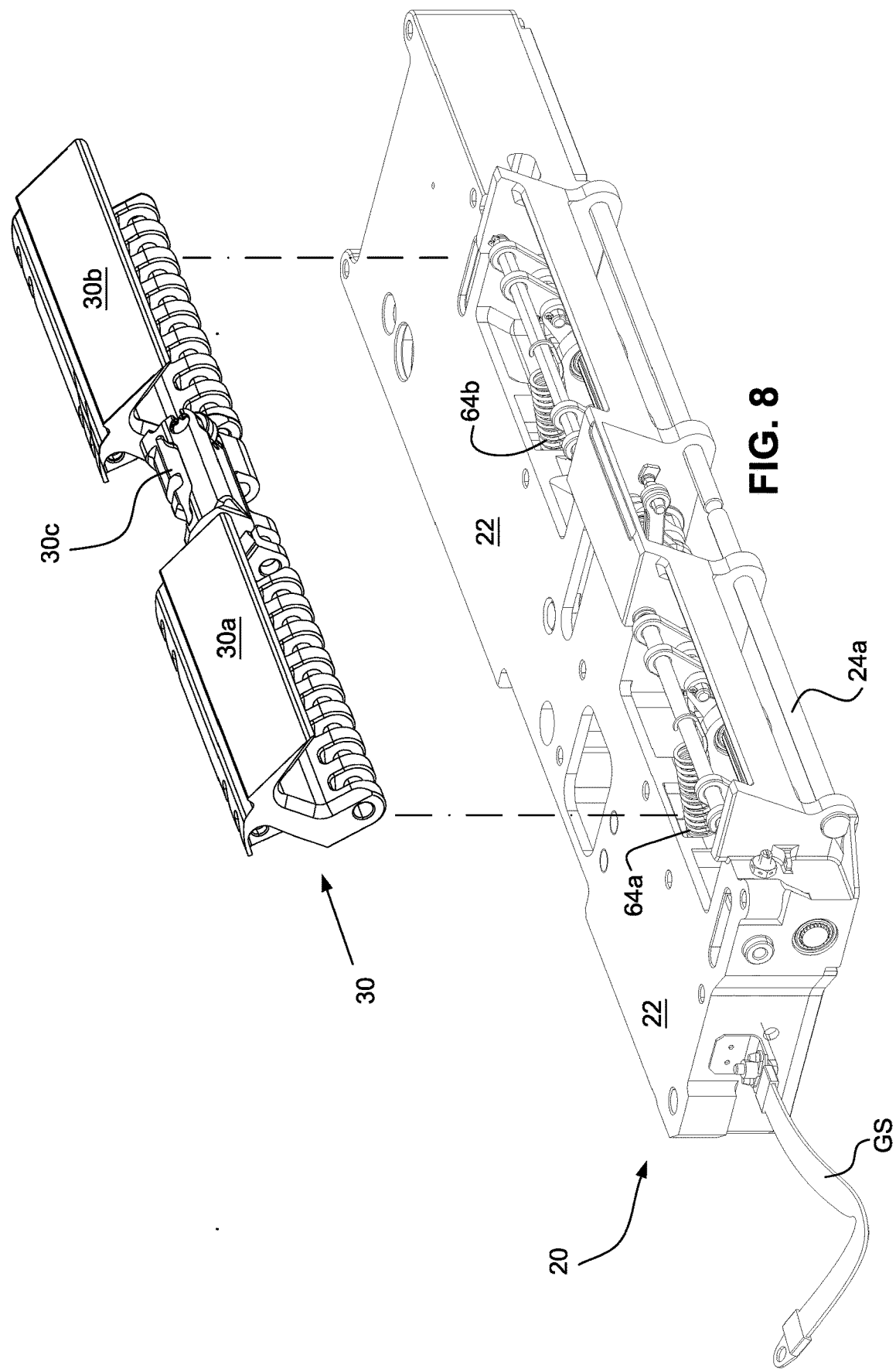
FIG. 8 is a perspective view showing the pallet restraint element exploded from the actuator case assembly.

As shown in FIGS. 6-8, in order to positionally lock the cargo load pallet CLP relative to the cargo deck 10-3, the lock assembly 20 is provided with a pallet restraint element 30 which integrally includes a pair of restraint plates 30a, 30b spaced apart along the longitudinal axis $A_L$ of the aircraft CA and a restraint detent 30c disposed therebetween. As shown in FIGS. 5A and 5B, when the lock assembly 20 is in the deployed mode, the restraint plates 30a, 30b and restraint detent 30c of the restraint element 30 can be moved between locked and released conditions relative to the cargo load platform CLP, respectively. Each of the restraint plates 30a is therefore sized and configured so as to be capable of being extended over and engaged with an adjacent lateral edge LE of the cargo load pallet CLP while the restraint detent 30c is sized and configured so as to be positionable within an edge recess ER of the cargo load pallet CLP when in the locked condition as shown in FIG. 5A but may be retracted away from the cargo load pallet CLP when in the released condition as shown in FIG. 5B. Thus, when in the locked condition as shown in FIG. 5A, the restraint plates 30a, 30b serve to positionally restrain the cargo load pallet CLP in direction vertically transverse to the longitudinal axis $A_L$ of the aircraft CA while the restraint detent 30c serves to positionally restrain the cargo load pallet CLP in a direction parallel to the longitudinal axis $A_L$ of the aircraft CA. In such a manner, therefore, the cargo load pallet CLP is positionally locked relative to the cargo deck 10-3. However, when in the released condition as shown in FIG. 5B, the restraint plates 30a, 30b and restraint detent 30c are separably disengaged from the cargo load pallet CLP so as to allow the cargo load pallet CLP to be positionally moved along the cargo deck 10-3.

Accompanying FIGS. 9-19 show the actuator mechanisms within the actuator case 22 that serve to move the lock assembly 20 between the deployed and stowed modes as well as to move the restraint element 30 between the locked and released conditions.

Figure 9:
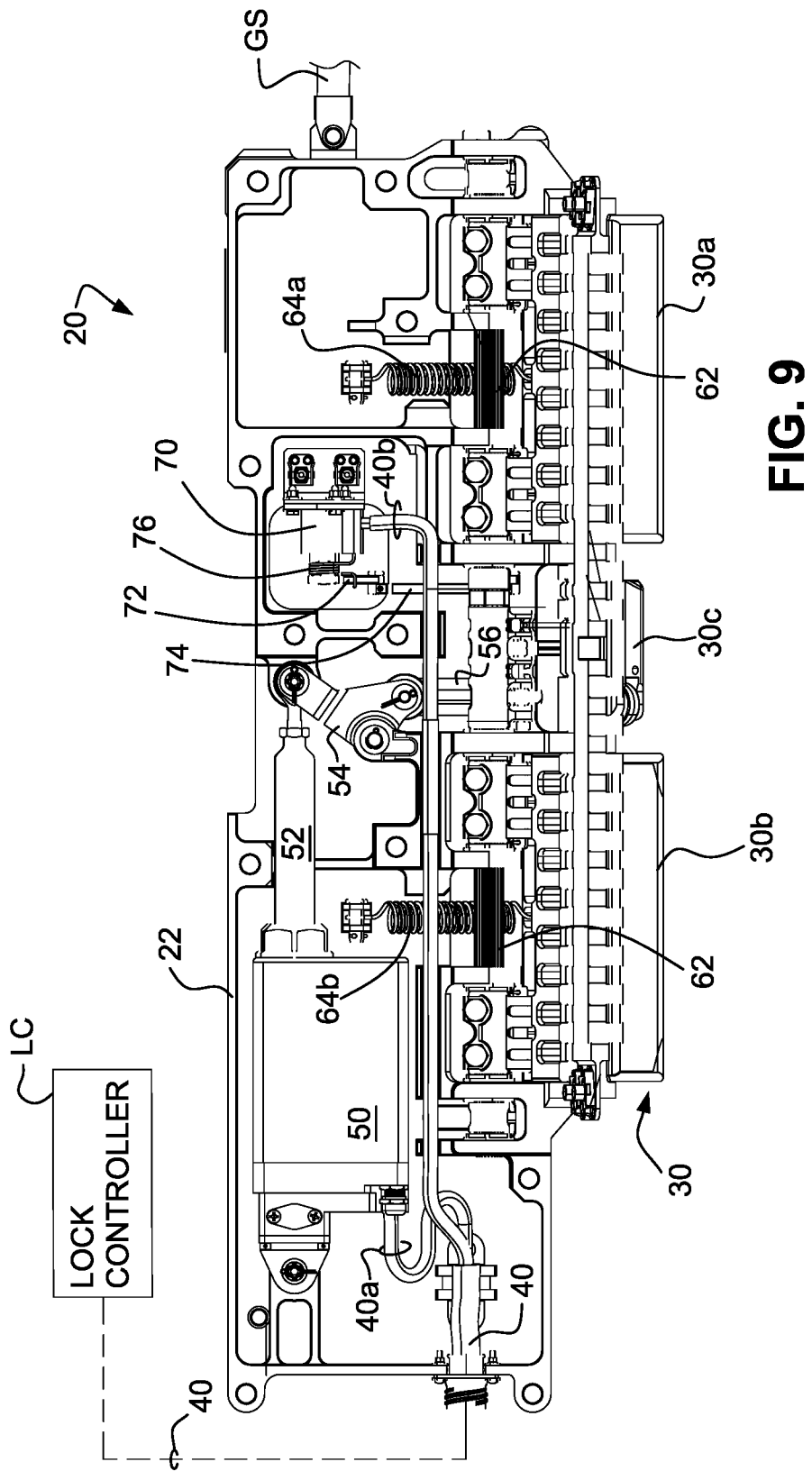
FIGS. 9 and 10 are bottom plan views of the actuator case assembly with the cover removed and the mechanisms therein depicted in locked and released conditions, respectively.
Figure 10:
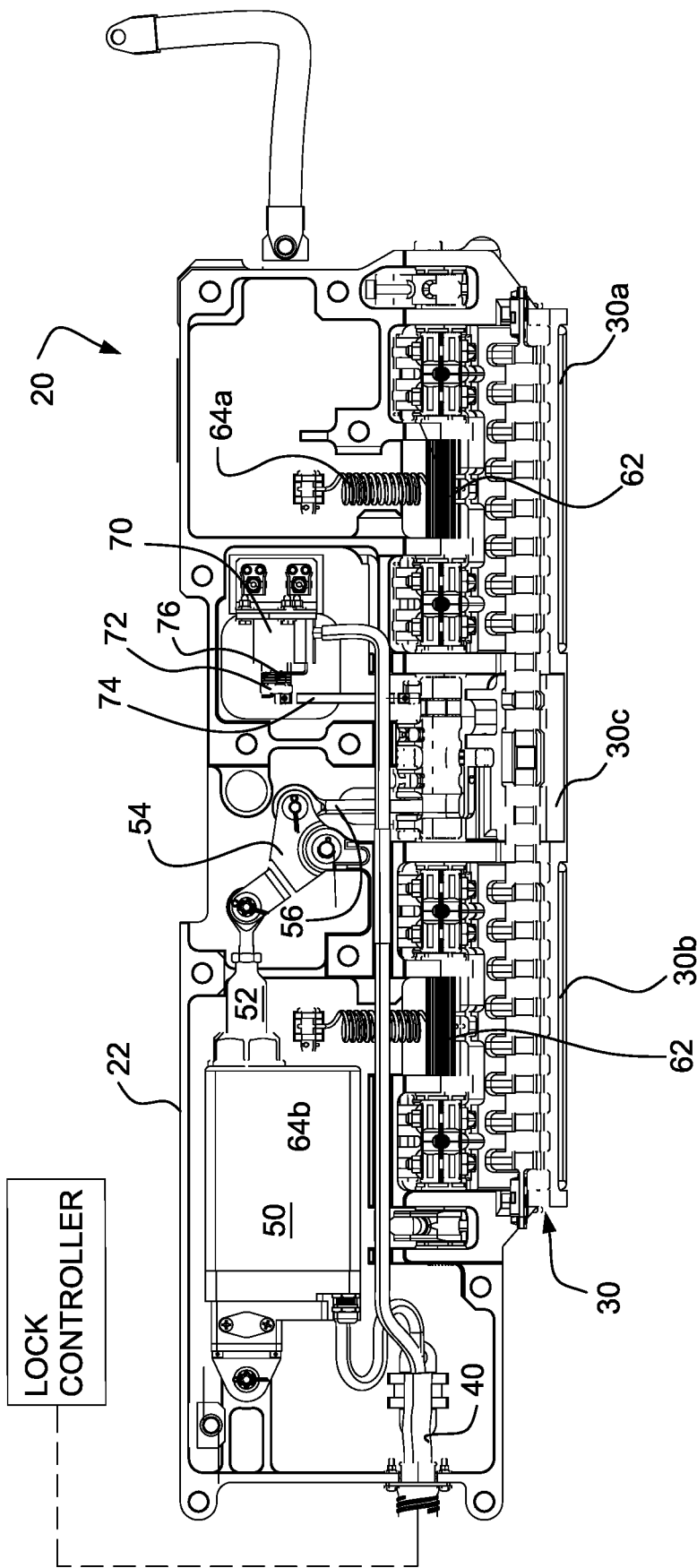
Figure 11:
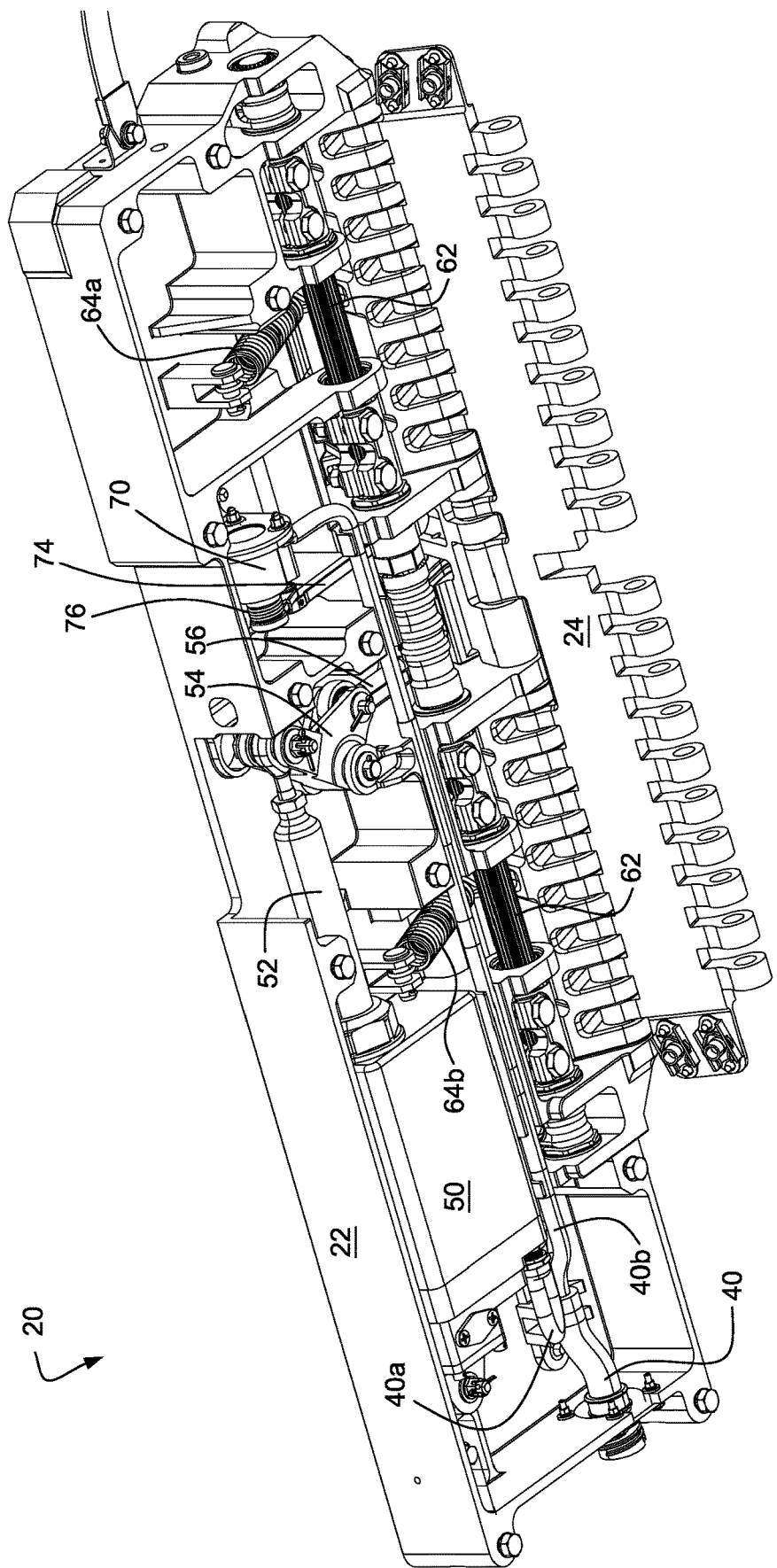
FIGS. 11 and 12 are bottom perspective views as seen from the rear of the actuator case assembly with the cover removed and the mechanisms therein depicted in locked and released conditions, respectively.
Figure 12:
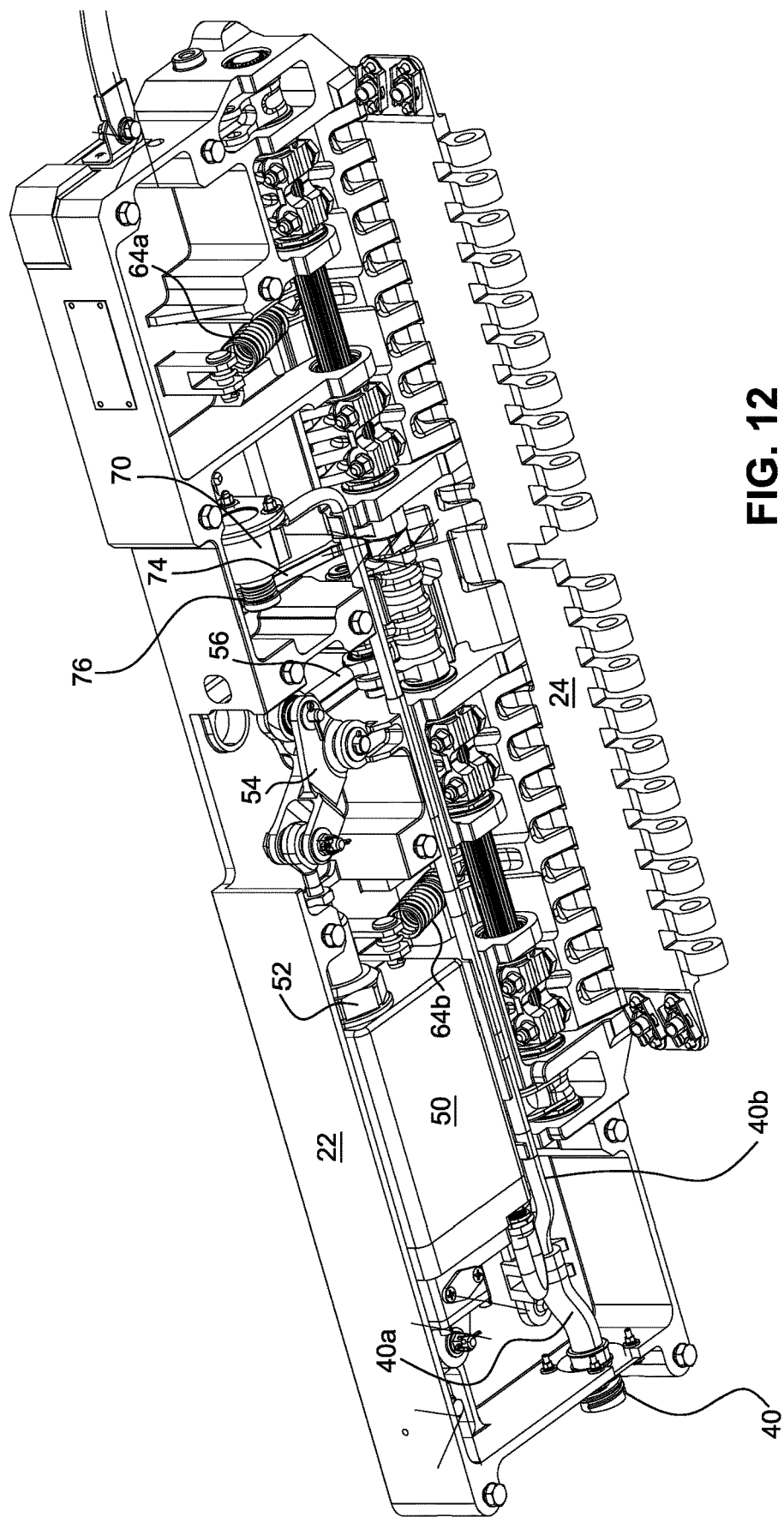
Figure 13A:
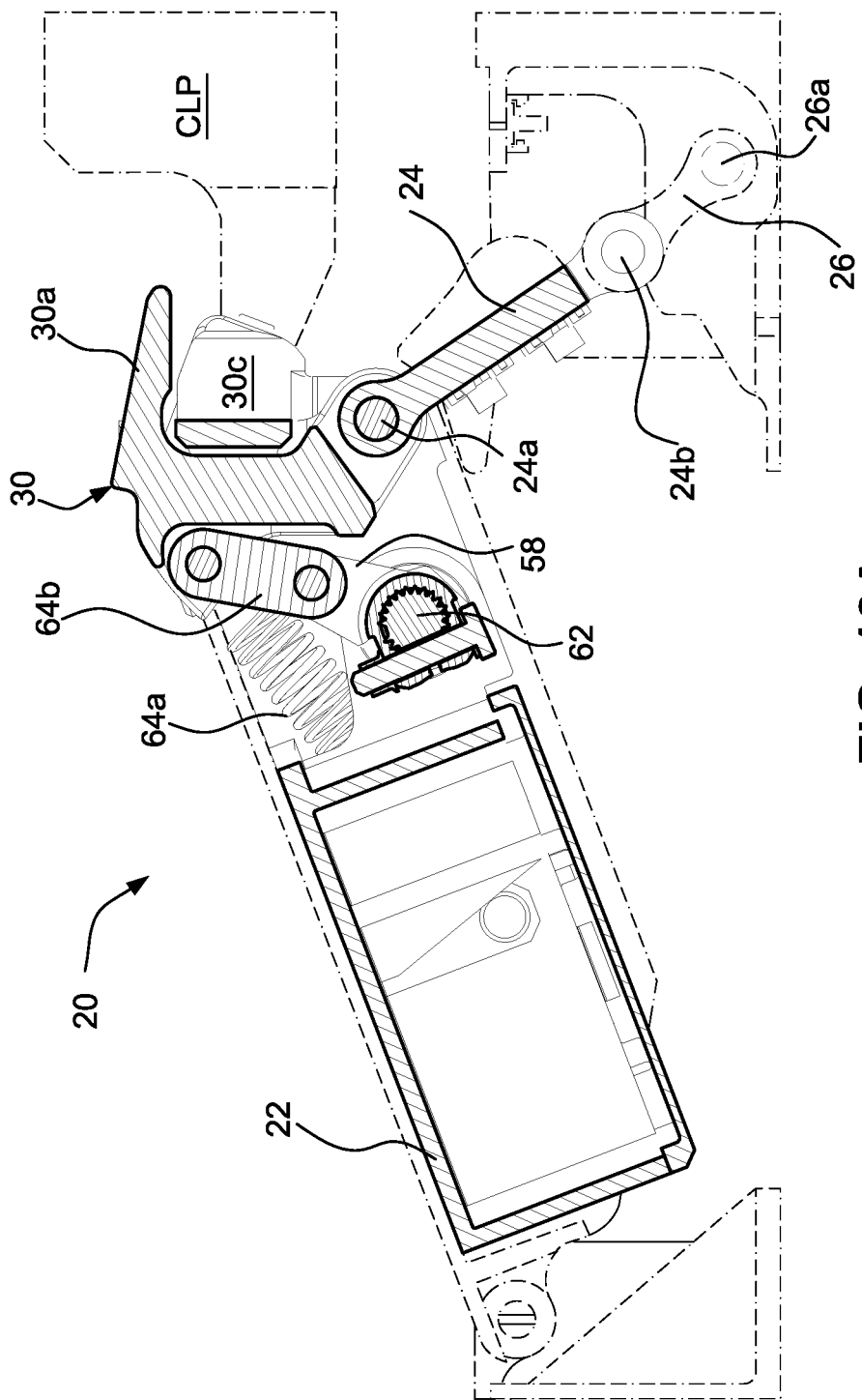
FIGS. 13A and 13B depict the actuator mechanisms of the lock case in the locked and released conditions as taken along lines 13A-13A and 13B-13B in FIGS. 6 and 7, respectively.
Figure 13B:
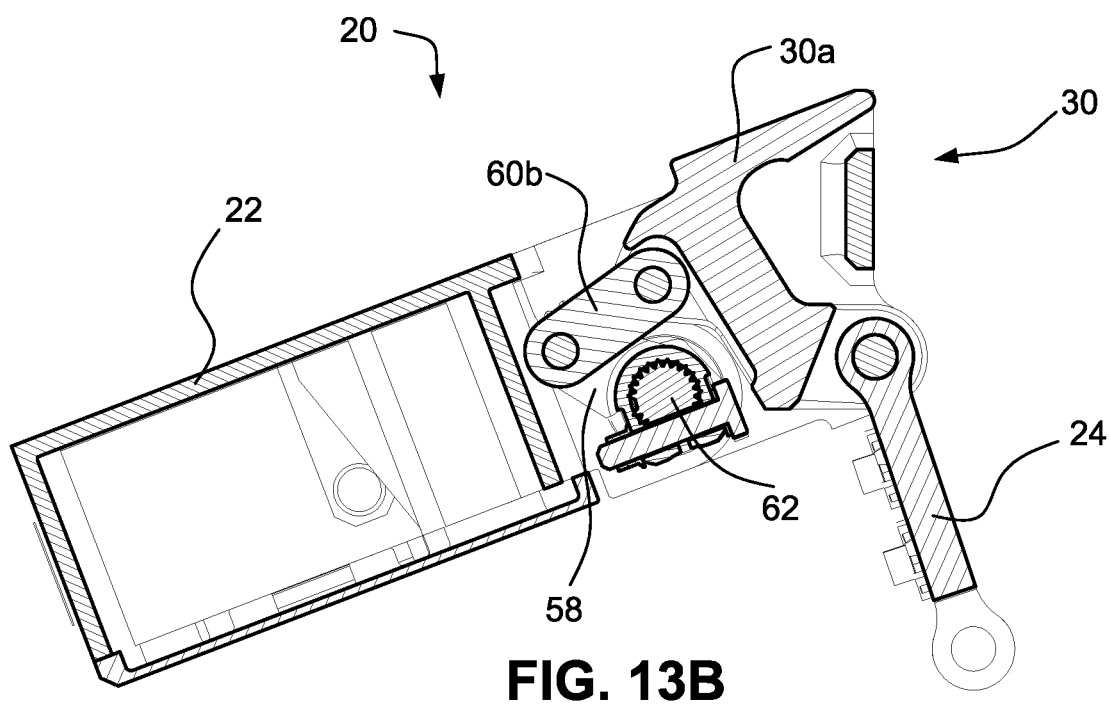
Figure 14A:
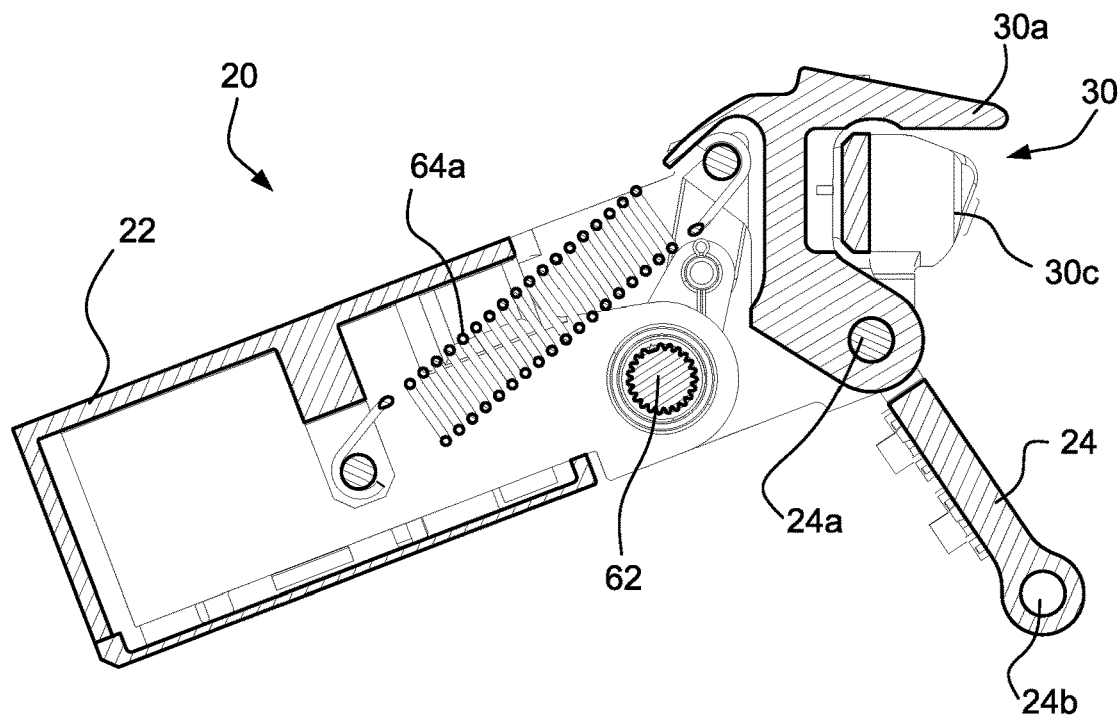
FIGS. 14A and 14B depict the actuator mechanisms of the lock case in the locked and released conditions as taken along lines 14A-14A and 14B-14B in FIGS. 6 and 7, respectively.
Figure 14B:
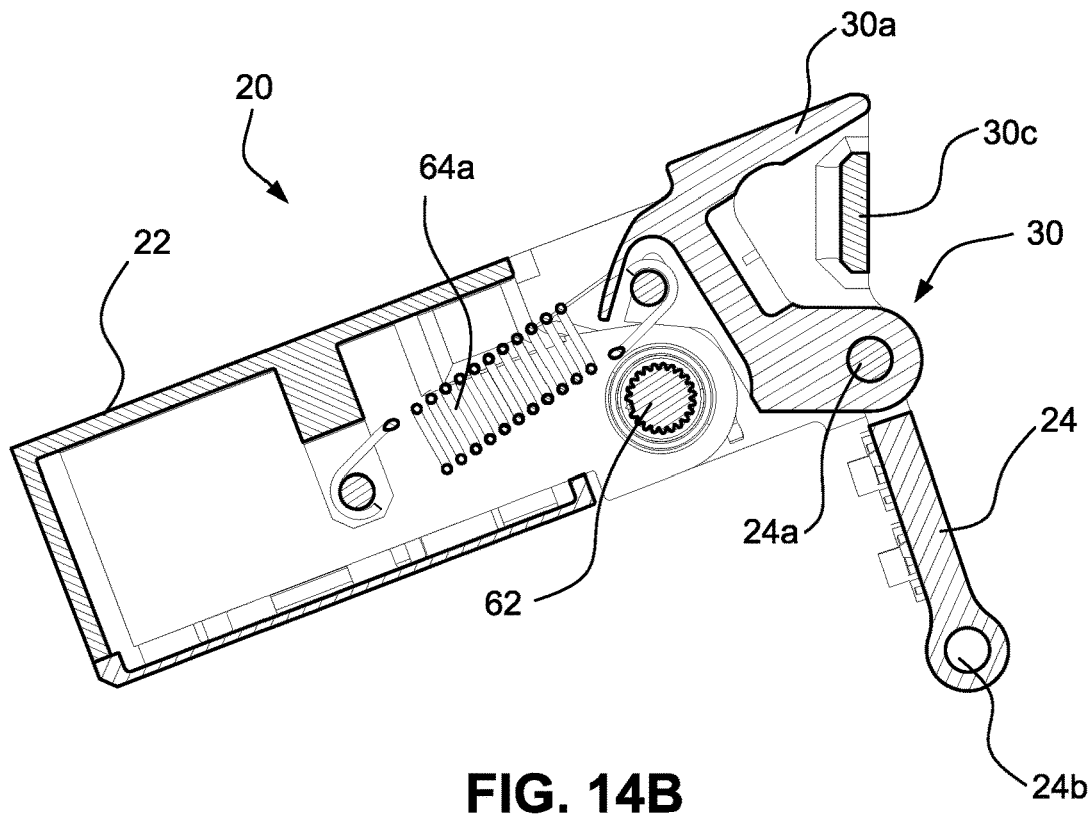
Figure 15A:
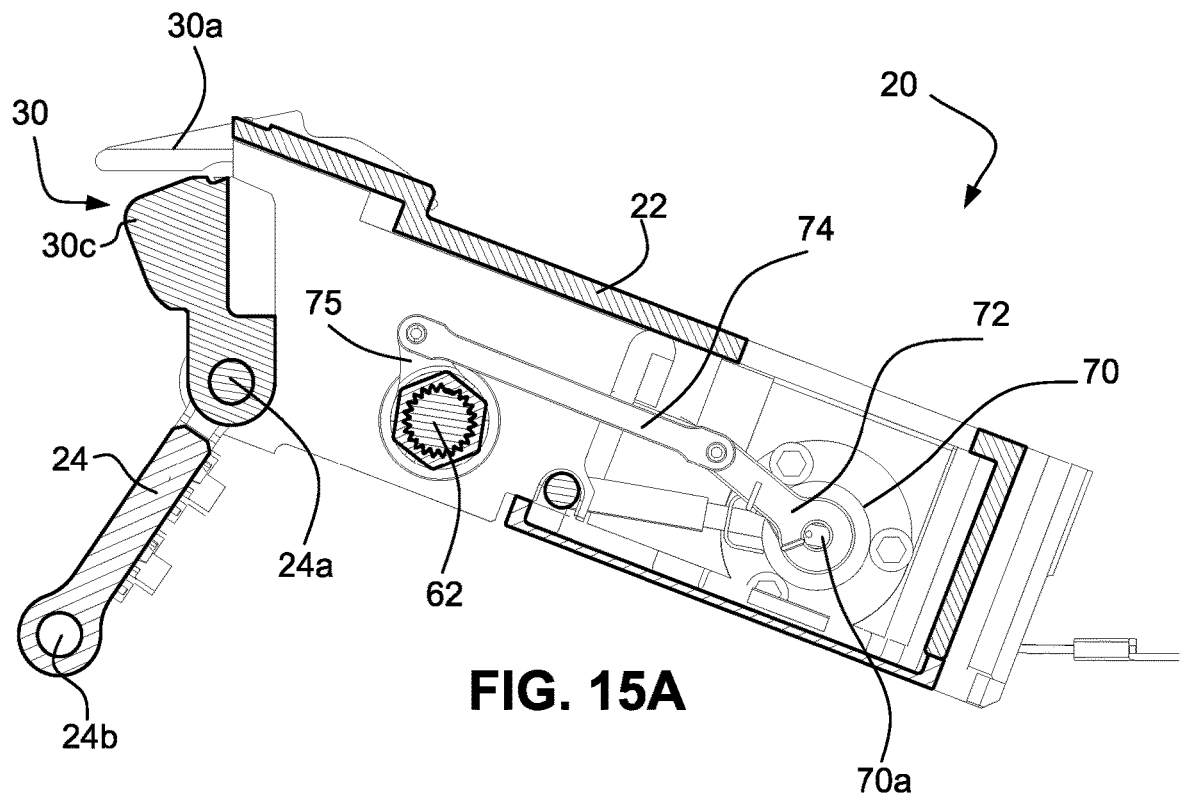
FIGS. 15A and 15B depict the actuator mechanisms of the lock case in the locked and released conditions as taken along lines 15A-15A and 15B-15B in FIGS. 6 and 7, respectively.
Figure 15B:
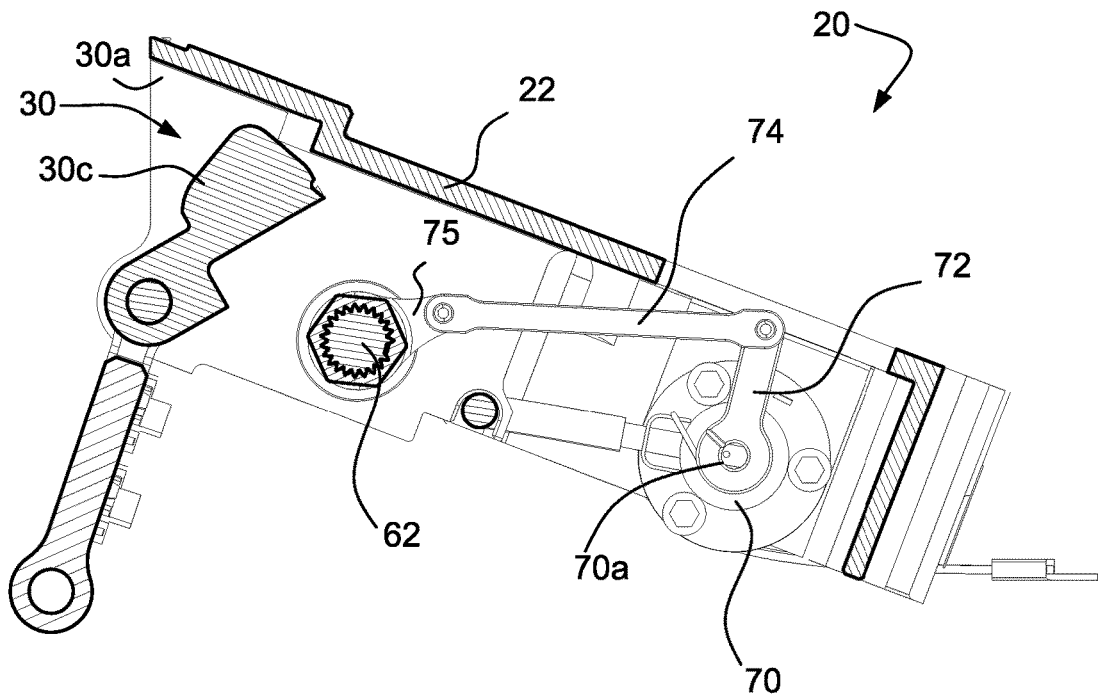
Figure 16A:
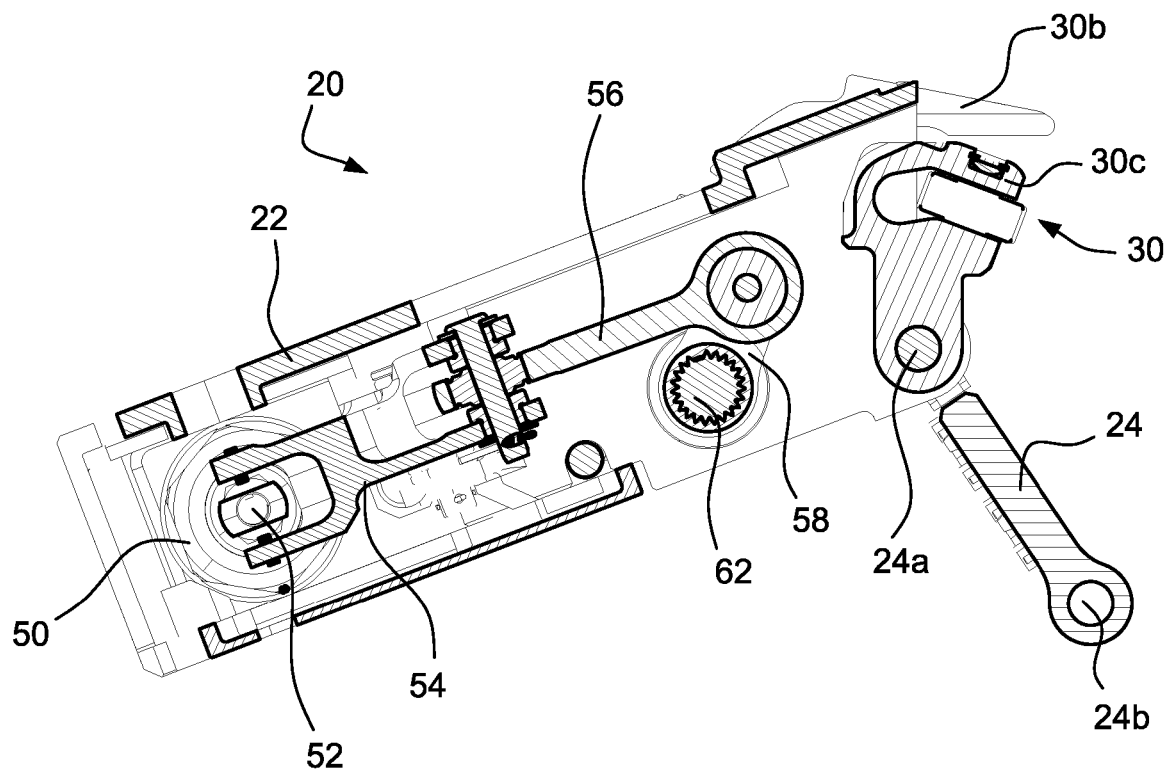
FIGS. 16A and 16B depict the actuator mechanisms of the lock case in the locked and released conditions as taken along lines 16A-16A and 16B-16B in FIGS. 6 and 7, respectively.
Figure 16B:
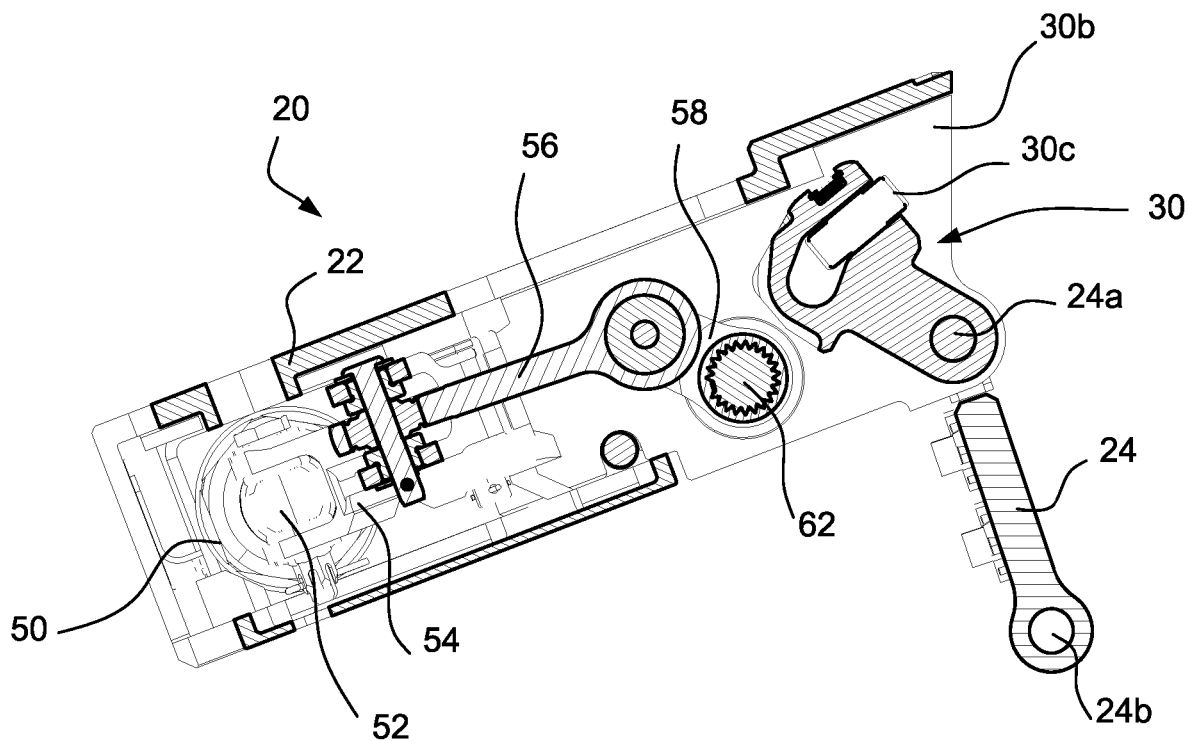

As can be seen especially in FIGS. 9 and 10, the lock assembly 20 is operably connected to a lock controller LC via signal and power cables 40. The lock controller LC may be positioned anywhere convenient within the aircraft CA, for example, at the loadmaster's control console so as to allow the loadmaster to operate individual or designated groups of lock assemblies 20 during loading and unloading operations. Individual signal and power cables 40a and 40b from the lock controller LC are provided so as to electrically interconnect the lock controller LC with a linear actuator 50 and the rotary transducer 70 within the actuator case 22. The actuator case 22 may be electrically grounded to the aircraft frame structures by means of a grounding strap GS. The linear actuator 50 serves to move the restraint element 30 between the locked and released conditions thereof. Thus, during loading/unloading operations of palletized cargo onto the cargo deck 10-3 of the cargo aircraft CA, the loadmaster may send appropriate lock/release signals via the lock controller to the linear actuator 50 associated with the lock assembly to cause the restraint element 30 to be moved between the locked/released conditions as may be required.

The linear actuator 50 includes an actuator rod 52 that is operably connected to a rocker link 54. The rocker link 54 drives a linkage rod 56 which is pivotally connected at its distal end to a proximal end of a bell crank 58 which in turn is pivotally connected to the proximal ends of coupler links 60a, 60b operable attached to the restraint element 30. The distal end of the bell crank 58 is positionally coupled to a splined command shaft 62. Thus, in response to extension or retraction of the actuator rod 52 as commanded by the linear actuator 50, the restraint element 30 will be caused to be pivotally moved between its locked and released conditions by the coupler links 60a, 60b. It will especially be noted, e.g., from FIGS. 18A and 18B that while in the locked condition, an over-the-center locking arrangement is established by the bell crank 58 and the coupler link 60b so as to positionally secure the restraint element 30 in the locked condition thereof (see e.g., FIG. 13A). Tension springs 64a, 64b connected between the restraint element 30 and the actuator case 22 will therefore be placed under tension when the restraint element is moved to its locked condition. As such, a bias force will be exerted on the restraint element to assist it to move from the locked condition to the released condition upon retraction of the actuator rod 52 upon actuation of the linear actuator 50. The bias force will therefor assist to release the over-the-center locking arrangement between the bell crank 50 and the coupler link 60 so as to allow the restraint element to move back to a released condition thereof when commanded by the actuator 50.

Figure 17A:
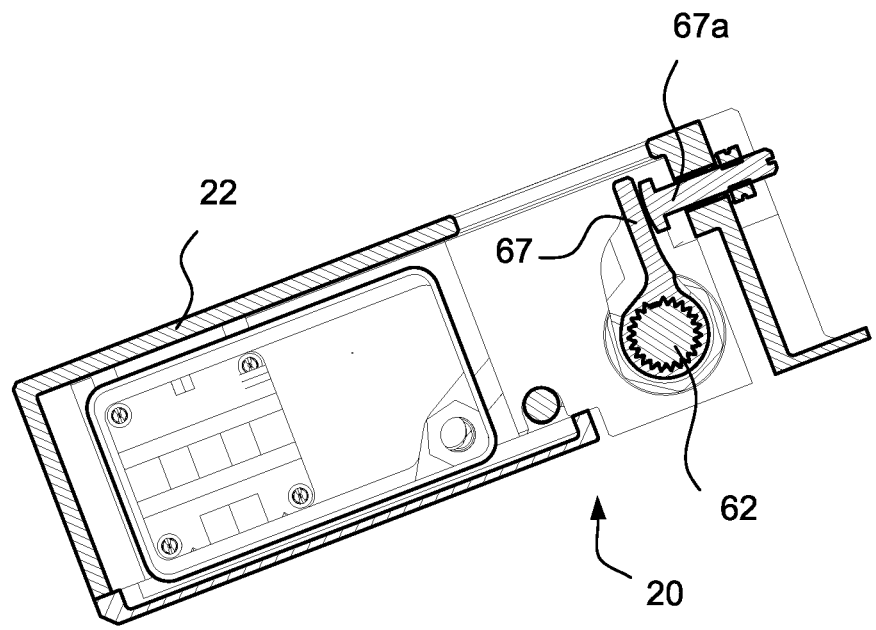
FIGS. 17A and 17B depict the actuator mechanisms of the lock case in the locked and released conditions as taken along lines 17A-17A and 17B-17B in FIGS. 6 and 7, respectively.
Figure 17B:
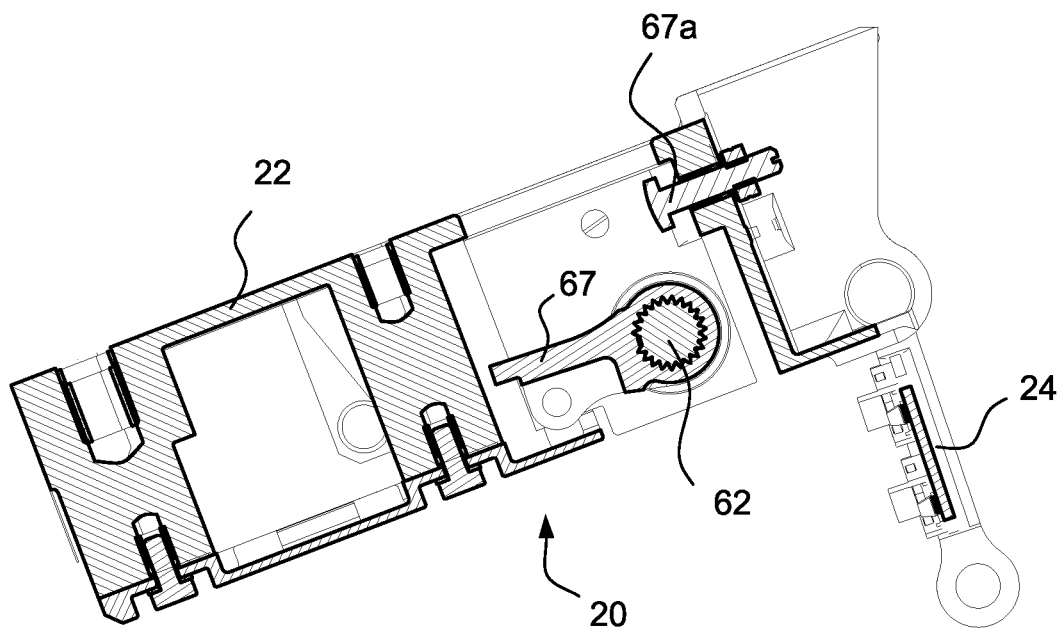
Figure 18A:
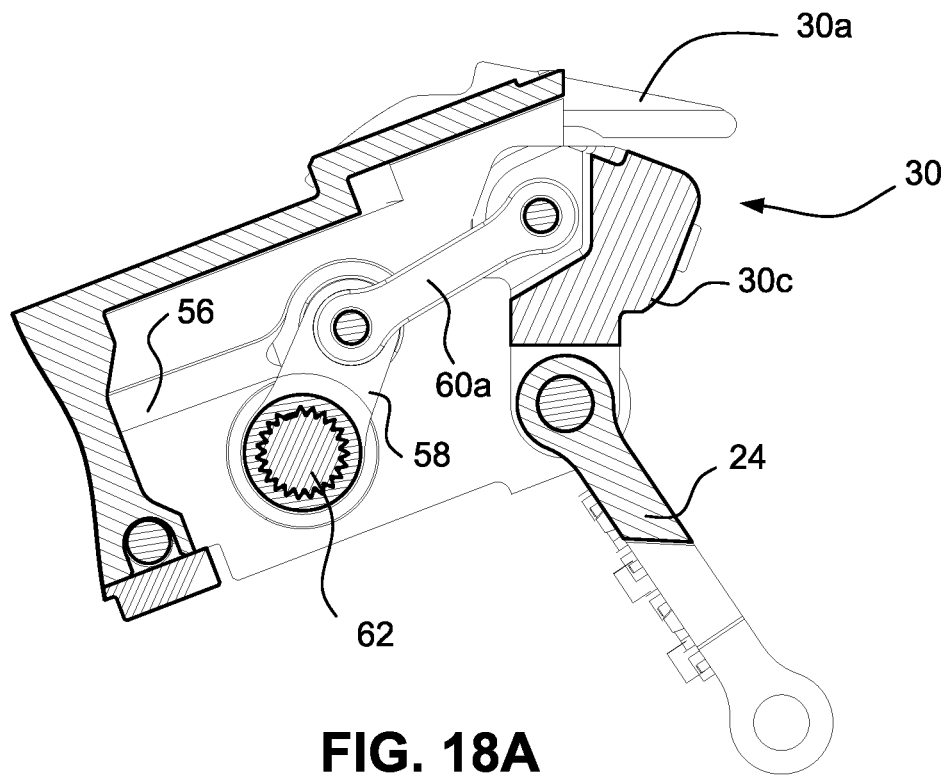
FIGS. 18A and 18B depict the actuator mechanisms of the lock case in the locked and released conditions as taken along lines 18A-18A and 18B-18B in FIGS. 6 and 7, respectively.
Figure 18B:
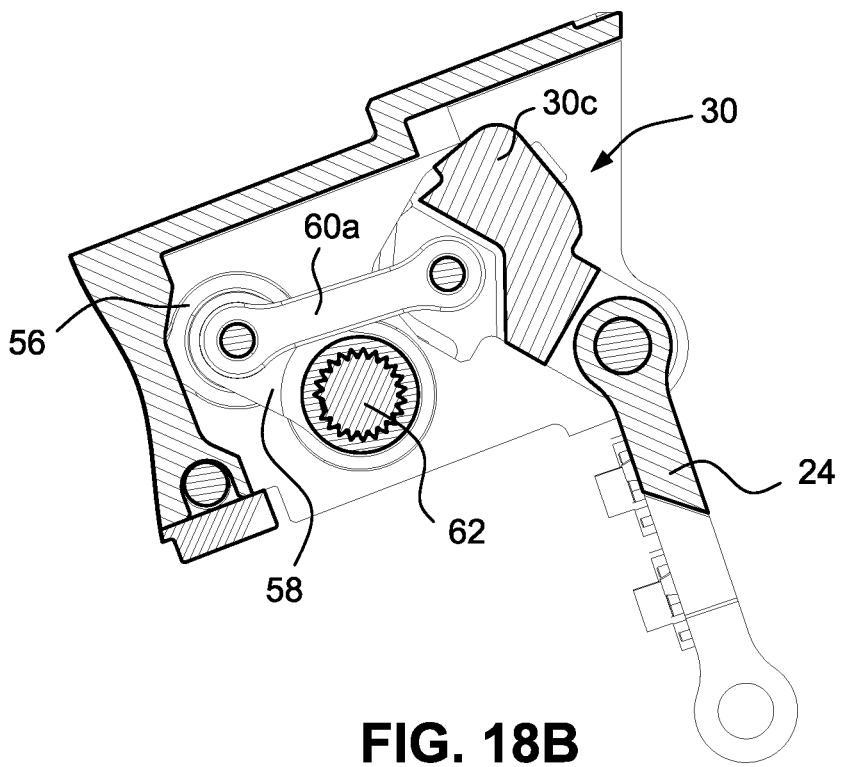
Figure 19:
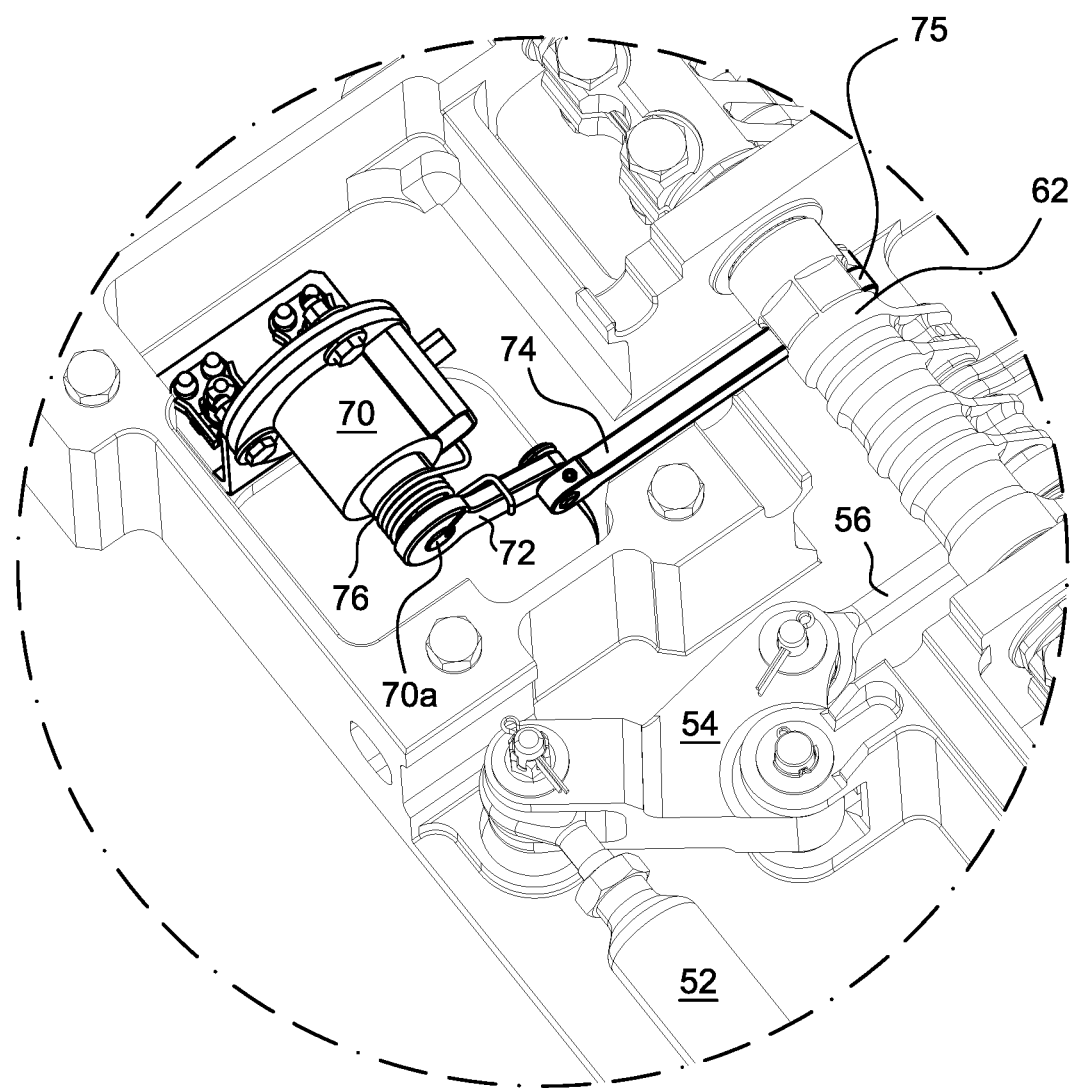
FIG. 19 is a detailed perspective view showing a rotary transducer when the actuator mechanisms of the lock case are in a locked condition.

As is shown in FIGS. 17A and 17B, the splined shaft 62 carries a rotary stop element 67 that rotates with the shaft 62 when commanded by the linear actuator 50 in the manner described above. An adjustable stop pin 67a may be provided so as to establish a limit stop for the locked condition of the restraint element 30 whereas a portion of the actuator case 22 serves as a limit stop when the restraint element 30 is in the released condition.

A rotary transducer 70 such as a Rotary Variable Differential Transformer (RVDT) is provided so as to sense the position of the restraint element 30 and provide position signals for the same to the lock controller LC. As is shown in greater detail in FIG. 19, the rotary transducer 70 includes a crank arm 72 connected at a proximal end to the shaft 70a of the transducer 70 and at a distal end to a coupler link 74. The distal end of the coupler link 70 is in turn connected to a bell crank 75 positionally coupled to the splined shaft 62. Thus rotation of the splined shaft 62 will rotate the bell crank 74 which in turn drives the crank arm 72 to thereby rotate the shaft 70a. A torsion spring 76 operably exerts a torsional spring force onto the crank arm 72 to assist in its movements. Thus, upon rotation of the splined shaft 62, the shaft 70a of the rotary transducer 70 will be responsively rotated which in turn causes the transducer 70 to generate position signals that may be communicated to the lock controller LC via cabling 40b. Thus, during operation of the restraint element 30 as described hereinabove, the rotary transducer 70 is capable of sending position signals to the lock controller LC so as to confirm the proper positioning of the restraint element 30 relative to the cargo load pallet CLP or alert the loadmaster to any abnormal positioning of the restraint element 30 that may occur so that remedial action can be taken.

While reference is made to a particular embodiment of the invention, various modifications within the skill of those in the art may be envisioned. Therefore, it is to be understood that the invention is not to be limited to the disclosed embodiment, but on the contrary, is intended to cover various modifications and equivalent arrangements included within the spirit and scope thereof.

What is claimed is:

1. An aircraft cargo pallet lock assembly comprising:
   an actuator case;

a restraint element which comprises at least one restraint plate and restraint detent, the restraint element being connected to the actuator case for pivotal movements between locked and released conditions relative to an edge of a cargo load pallet positioned on a cargo deck of an aircraft so as to positionally restrain the cargo load pallet against movement in both vertical and horizontal planes relative to the cargo deck; and an actuator assembly operably connected to the restraint element for moving the restraint element between the locked and released conditions thereof, wherein the restraint plate is positioned over an edge of the cargo load pallet when the restraint element is in the locked condition thereof so as to positionally restrain the cargo load pallet against movement in the vertical plane relative to the cargo deck, and wherein the restraint detent is positioned in an edge recess of the cargo load pallet when the restraint element is in the locked condition thereof so as to positionally restrain the cargo load pallet against movement in the horizontal plane relative to the cargo deck.

2. The aircraft cargo pallet lock assembly according to claim 1, wherein the restraint element comprises a spaced apart pair of restraint plates with the restraint detent being positioned therebetween.

3. The aircraft cargo pallet lock assembly according to claim 1, wherein the actuator case is connectable to the cargo deck for movements between a stowed mode, wherein the actuator case is substantially flush with the cargo deck, and a deployed mode, wherein the actuator case is raised above the cargo deck.

4. The aircraft cargo pallet lock assembly according to claim 3, wherein the actuator case includes a hinge assembly at a rearward portion thereof that allows for pivotal connection to the cargo deck, and a linkage support plate at a forward portion thereof that allows for pivotal interconnection between the forward portion of the actuator case to the cargo deck to allow the actuator case to be pivotally moved between the stowed and deployed conditions thereof.

5. The aircraft cargo pallet lock assembly according to claim 1, wherein the actuator assembly comprises:
a linear actuator having an actuator rod that is reciprocally moveable between extended and retracted conditions; and
a linkage assembly which translates reciprocal movement of the actuator rod between the extended and retracted conditions into pivotal movement of the restraint element between the locked and released conditions, respectively.

6. The aircraft cargo pallet lock assembly according to claim 5, wherein the linkage assembly comprises:
a splined command shaft;
a bell crank positionally coupled to the command shaft;
a rocker linkage assembly operably interconnecting the actuator rod of the linear actuator to the command shaft; and
a coupler link operably interconnecting the restraint element to the bell crank.

7. The aircraft cargo pallet lock assembly according to claim 6, wherein the rocker linkage assembly comprises a linkage rod and a rocker link operably interconnecting a proximal end of the linkage rod to a distal end of the actuator rod, wherein a distal end of the linkage rod is operably connected to the bell crank.

8. The aircraft cargo pallet lock assembly according to claim 6, wherein the coupler link and bell crank are in an over-the-center locking arrangement when the restraint element is in the locked condition thereof.

9. The aircraft cargo pallet lock assembly according to claim 8, wherein the linkage assembly further comprises a tension spring operably connected to the restraint element for exerting a bias force on the restraint element in a direction to move the restraint element into the released condition thereof.

10. The aircraft cargo pallet lock assembly according to claim 1, wherein the actuator assembly includes a rotary transducer for sensing positions of the restraint element when moved between the locked and released conditions thereof.

11. A cargo aircraft which comprises the cargo pallet lock assembly according to claim 1.

12. A cargo aircraft comprising:
a fuselage defining a cargo space;
a cargo deck within the fuselage for supporting a plurality of cargo load pallets thereon, and
a plurality of cargo pallet lock assemblies laterally spaced apart relative to a longitudinal axis of the cargo aircraft for positionally restraining the cargo load pallets against movement in both vertical and horizontal planes relative to the cargo deck, wherein the cargo pallet lock assemblies comprise:
(i) an actuator case;
(ii) a restraint element which comprises at least one restraint plate and restraint detent, the restraint element being connected to the actuator case for pivotal movements between locked and released conditions relative to an edge of a cargo load pallet positioned on a cargo deck of an aircraft so as to positionally restrain the cargo load pallet against movement in both vertical and horizontal planes relative to the cargo deck; and
(iii) an actuator assembly operably connected to the restraint element for moving the restraint element between the locked and released conditions thereof, wherein
the restraint plate is positioned over an edge of the cargo load pallet when the restraint element is in the locked condition thereof so as to positionally restrain the cargo load pallet against movement in the vertical plane relative to the cargo deck, and wherein
the restraint detent is positioned in an edge recess of the cargo load pallet when the restraint element is in the locked condition thereof so as to positionally restrain the cargo load pallet against movement in the horizontal plane relative to the cargo deck.

13. The cargo aircraft according to claim 12, wherein the restraint element comprises a spaced apart pair of restraint plates with the restraint detent being positioned therebetween.

14. The cargo aircraft according to claim 12, wherein the actuator case is connectable to the cargo deck for movements between a stowed mode, wherein the actuator case is substantially flush with the cargo deck, and a deployed mode, wherein the actuator case is raised above the cargo deck.

15. The cargo aircraft according to claim 14, wherein the actuator case includes a hinge assembly at a rearward portion thereof that allows for pivotal connection to the cargo deck, and a linkage support plate at a forward portion thereof that allows for pivotal interconnection between the forward portion of the actuator case to the cargo deck to allow the actuator case to be pivotally moved between the stowed and deployed conditions thereof.

16. The cargo aircraft according to claim 12, wherein the actuator assembly comprises:
- a linear actuator having an actuator rod that is reciprocally moveable between extended and retracted conditions; and
- a linkage assembly which translates reciprocal movement of the actuator rod between the extended and retracted conditions into pivotal movement of the restraint element between the locked and released conditions, respectively.

17. The cargo aircraft according to claim 16, wherein the linkage assembly comprises:
- a splined command shaft;
- a bell crank positionally coupled to the command shaft;
- a rocker linkage assembly operably interconnecting the actuator rod of the linear actuator to the command shaft; and
- a coupler link operably interconnecting the restraint element to the bell crank.

18. The cargo aircraft according to claim 17, wherein the rocker linkage assembly comprises a linkage rod and a rocker link operably interconnecting a proximal end of the linkage rod to a distal end of the actuator rod, wherein a distal end of the linkage rod is operably connected to the bell crank.

19. The cargo aircraft according to claim 17, wherein the coupler link and bell crank are in an over-the-center locking arrangement when the restraint element is in the locked condition thereof.

20. The cargo aircraft according to claim 19, wherein the linkage assembly further comprises a tension spring operably connected to the restraint element for exerting a bias force on the restraint element in a direction to move the restraint element into the released condition thereof.

21. The cargo aircraft according to claim 12, wherein the actuator assembly includes a rotary transducer for positionally sensing the restraint element in the locked and released conditions thereof and issuing a position signal indicative of the locked and released conditions.

22. The cargo aircraft according to claim 21, further comprising a lock controller for receiving the position signal from the rotary transducer and providing a position indication in response thereto.

23. The cargo aircraft according to claim 21, further comprising a lock controller for receiving the position signal from the rotary transducer and providing a position indication in response thereto.

24. The cargo aircraft according to claim 16, further comprising a lock controller operably connected to the linear actuator, the lock controller issuing a command signal to the linear actuator to thereby responsively activate the linear actuator and cause the restrain element to move between the locked and unlocked conditions thereof.

25. The cargo aircraft according to claim 24, wherein the actuator assembly includes a rotary transducer for positionally sensing the restraint element in the locked and released conditions thereof and issuing a position signal to the lock controller indicative of the locked and released conditions.

* * * * *